O. KEIRSTEAD.
WHEEL RUNNER.
APPLICATION FILED SEPT. 9, 1914.

1,148,386.

Patented July 27, 1915.
2 SHEETS—SHEET 1.

Witnesses
Frederick L. Fox

Inventor
Oliver Keirstead.
By Victor J. Evans.
Attorney

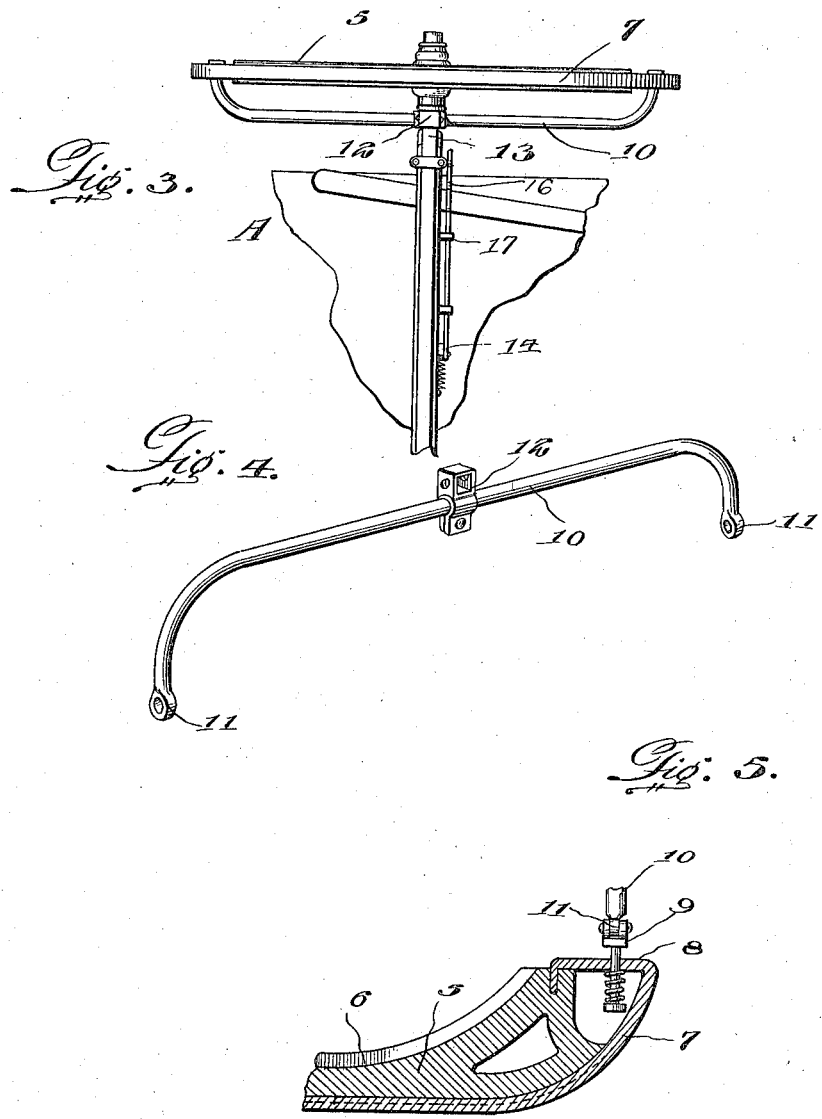

UNITED STATES PATENT OFFICE.

OLIVER KEIRSTEAD, OF GROTON, CONNECTICUT.

WHEEL-RUNNER.

1,148,386.　　　　Specification of Letters Patent.　　Patented July 27, 1915.

Application filed September 9, 1914. Serial No. 860,903.

*To all whom it may concern:*

Be it known that I, OLIVER KEIRSTEAD, a citizen of the United States, residing at Groton, in the county of New London and State of Connecticut, have invented new and useful Improvements in Wheel-Runners, of which the following is a specification.

The invention relates to wheel runners for vehicles, and more particularly to the class of detachable runners.

The primary object of the invention is the provision of a runner of this character wherein the same can be detachably clamped to the wheel and its axle of a vehicle so as to convert the same into a sleigh for use during winter weather.

Another object of the invention is the provision of a runner wherein the wheel can be seated therein, thus obviating the necessity of the removal thereof when the vehicle is to be used as a sleigh, and thus avoiding considerable labor and time for converting the same for use either as a sleigh or wheeled vehicle, thereby rendering the same serviceable during different seasons.

A further object of the invention is the provision of a runner which is simple in construction, reliable and efficient in its purpose, readily and easily applied and detached for use or disuse as the occasion requires, and also one which is inexpensive in manufacture.

With these and other objects in view, the invention consists in the construction, combination and arrangement of parts as will be hereinafter fully described, illustrated in the accompanying drawings, and pointed out in the claim hereunto appended.

Figure 1:
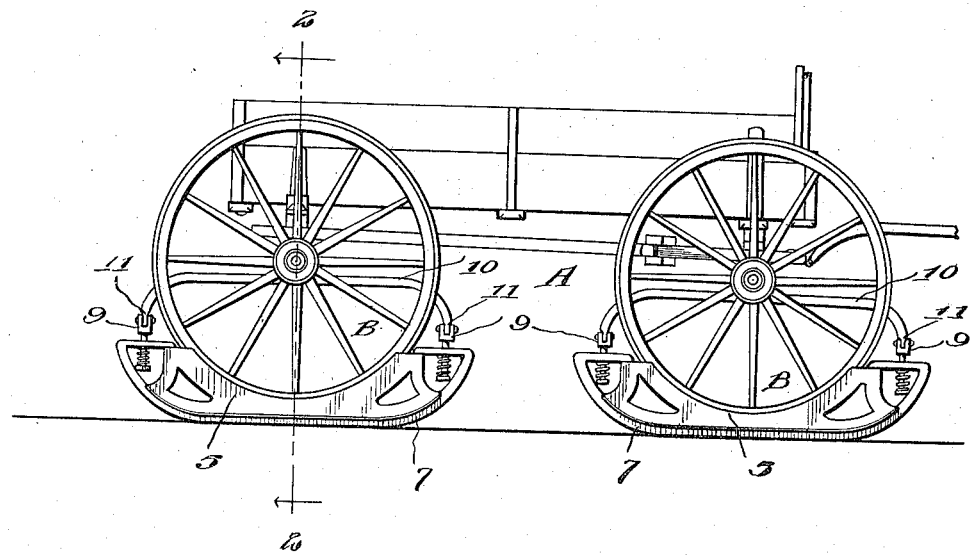
Figure 2:
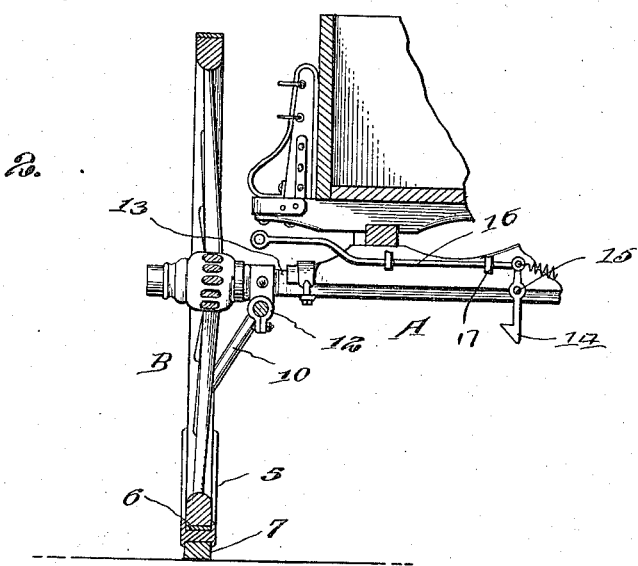

In the drawings:—Figure 1 is a side elevation of a vehicle, showing the runners constructed in accordance with the invention applied. Fig. 2 is a vertical sectional view on the line 2—2 of Fig. 1. Fig. 3 is a bottom plan view. Fig. 4 is a perspective view of the hanger or bracket for the runner. Fig. 5 is a fragmentary longitudinal sectional view through the runner.

Similar reference characters indicate corresponding parts throughout the several views in the drawings.

Referring to the drawings in detail, A designates generally the running gear of a vehicle of the wheeled type, and B the wheels thereof, which are of the usual well-known construction. Detachably connected to each wheel and its axle is a runner, hereinafter fully described.

The runner comprises a body 5 forming a chair for the wheel B, the latter being seated within a semi-circular recess 6 formed in the body 5 centrally thereof, the said recess being formed with a channeled wall adapted to accommodate the periphery of the wheel to prevent it from working out of the recess laterally of the body.

Mounted upon the body 5 is a shoe 7 which is formed from a bar bent to provide the in-turned ends 8 which are bolted or otherwise secured to the body for the fastening of the shoe thereon. Adjustably mounted in the in-turned ends 8 of the shoe 7 are the threaded stems of bifurcated bearings 9 to which is connected a hanger or bracket hereinafter more fully described.

The hanger or bracket comprises a bowed frame 10 having the reduced ends 11 which fit into the bifurcations in the bearings 9 disposed forwardly and rearwardly with respect to the wheel B when seated in the body 5, the ends 11 being detachably bolted or otherwise secured in the bearings, while engaging the frame 10 medially thereof is an axle clip 12, the same being fastened to the axle 13 on which the wheel B is mounted.

On the fastening of the runner by the use of the bracket when the wheel B is engaged in the seat formed in the body of the runner, the latter will be firmly held so that the vehicle can be used as a sleigh when the runners are applied to all of the wheels thereof. The adjustability of the bearings 9 permits the positioning of the runner relative to the wheel of the vehicle so that it may be firmly fastened in working relation to the wheel without necessitating the removal of the wheels of the vehicle when the same has been converted into a sleigh.

Mounted upon the axle 13 is a spring-held latch 14, the same being supported upon a pivot 15 and is adapted for engagement with the runner when swung inwardly and upwardly for disuse, and in this manner the said runner can be held so that the vehicle can be used with its wheel in the ordinary well-known manner. The latch 14 has connected thereto a pull rod 16 which is supported in bearings 17 mounted on the axle so that a person can release the latch 14 for freeing the runner when the same is to be used upon the wheel so as to convert the vehicle into a sleigh.

From the foregoing description, taken in connection with the accompanying drawings, it is thought that the construction and manner of operation of the device will be clearly understood, and therefore a more extended explanation has been omitted.

What is claimed is:—

A runner of the class described comprising a body formed with a medial concaved portion having a channel for receiving the wheel of a vehicle, a shoe on said body and having in-turned ends fixed therein, bearings vertically mounted in the in-turned ends, resilient members acting upon the bearings for resisting upward movement thereof in the said ends, and a bracket swingingly connected to the bearings and adapted to be detachably clipped to an axle supporting the wheel.

In testimony whereof I affix my signature in presence of two witnesses.

OLIVER KEIRSTEAD.

Witnesses:
NELSON S. HOLDREDGE,
CHARLES F. KAIR.

Copies of this trade-mark may be obtained for five cents each, by addressing the "Commissioner of Patents, Washington, D. C."